United States Patent [19]

Scheier et al.

[11] 4,262,387
[45] Apr. 21, 1981

[54] METHOD AND APPARATUS FOR EVISCERATING POULTRY

[75] Inventors: Donald J. Scheier, Kansas City, Mo.; Jack L. Hathorn, Springdale, Ark.

[73] Assignee: Simon-Johnson Inc., Kansas City, Mo.

[21] Appl. No.: 74,255

[22] Filed: Sep. 10, 1979

[51] Int. Cl.³ .............................................. A22C 21/06
[52] U.S. Cl. ............................................. 17/45; 17/11
[58] Field of Search ...................................... 17/11, 45

[56] References Cited

U.S. PATENT DOCUMENTS

| 3,555,593 | 1/1971 | Scheier | 17/45 |
| 3,653,093 | 4/1972 | Scheier | 17/11 |
| 3,798,708 | 3/1974 | Scheier | 17/45 |
| 3,879,803 | 4/1975 | Verbakel | 17/11 |
| 3,983,601 | 10/1976 | Verbakel | 17/11 |
| 4,019,222 | 4/1977 | Scheier et al. | 17/11 |
| 4,131,973 | 1/1979 | Verbakel | 17/11 X |

Primary Examiner—Willie G. Abercrombie
Attorney, Agent, or Firm—Schmidt, Johnson, Hovey & Williams

[57] ABSTRACT

In the course of the mechanized eviscerating procedure, the viscera-removing tool is introduced into the body cavity of a carcass in an entry stroke through an opening at the stern of the carcass. The tool moves arcuately along the breast of the carcass during the entry stroke, and substantially at the full innermost limit of the entry stroke of the tool, the carcass is lifted by its shoulders upwardly against the lowermost tip of the tool to locate the latter substantially at the intersection of the neck and the shoulders within the body cavity. Simultaneously with this action, the neck of the carcass is cocked abruptly toward the breast side of the carcass to maximize the depth of insertion of the tool into the body cavity. Consequently, upon the withdrawal stroke of the tool along the backbone of the carcass, prongs on the tip of the tool snag the veins and arteries interconnecting the heart and lungs so that lungs are peeled out of their sockets substantially wholly intact by virtue of the pulling force generated by the veins and arteries.

26 Claims, 21 Drawing Figures

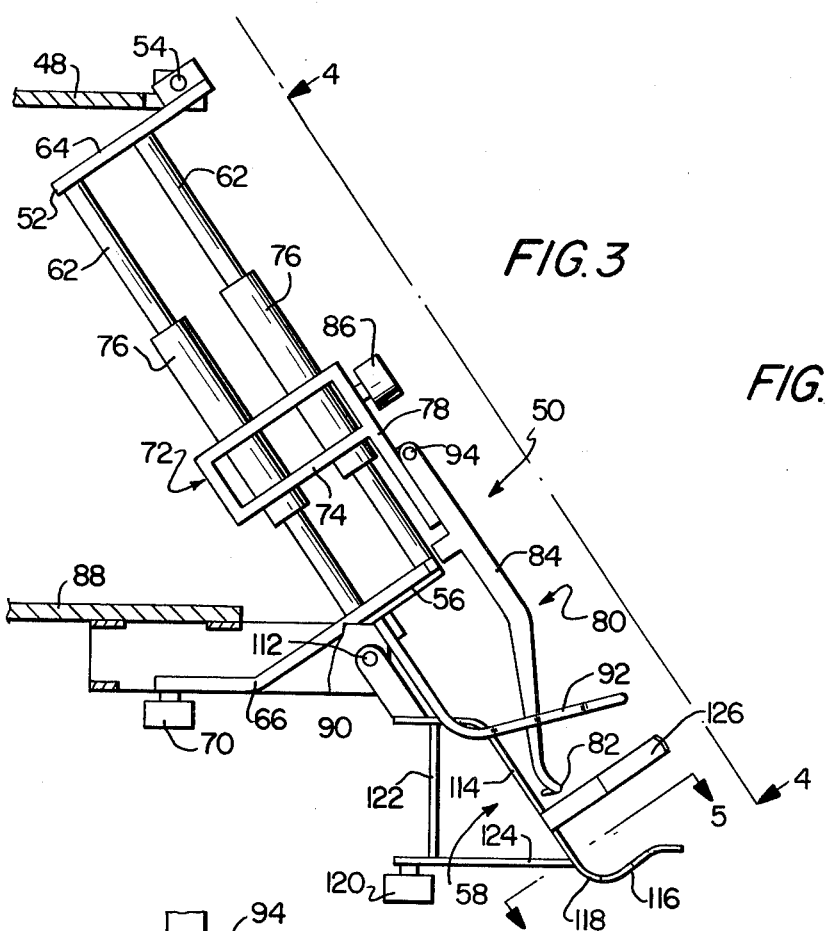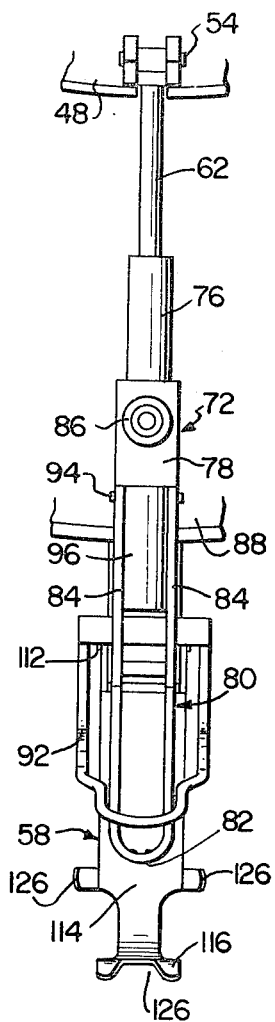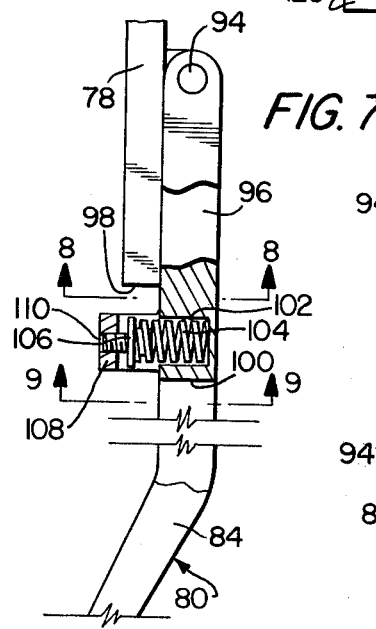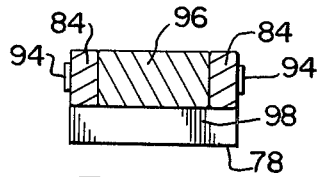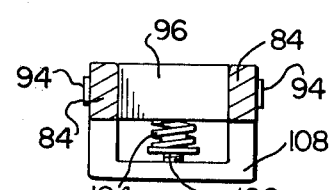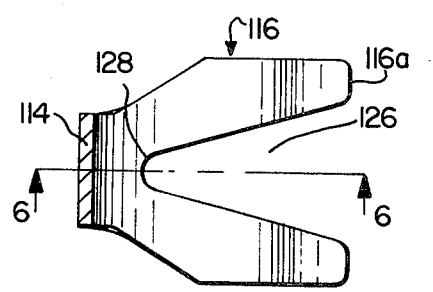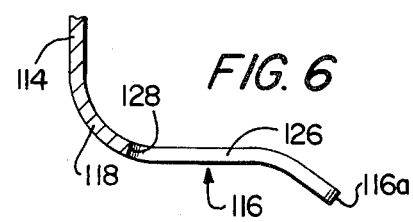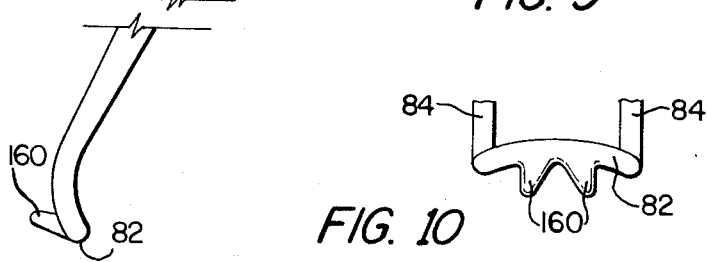

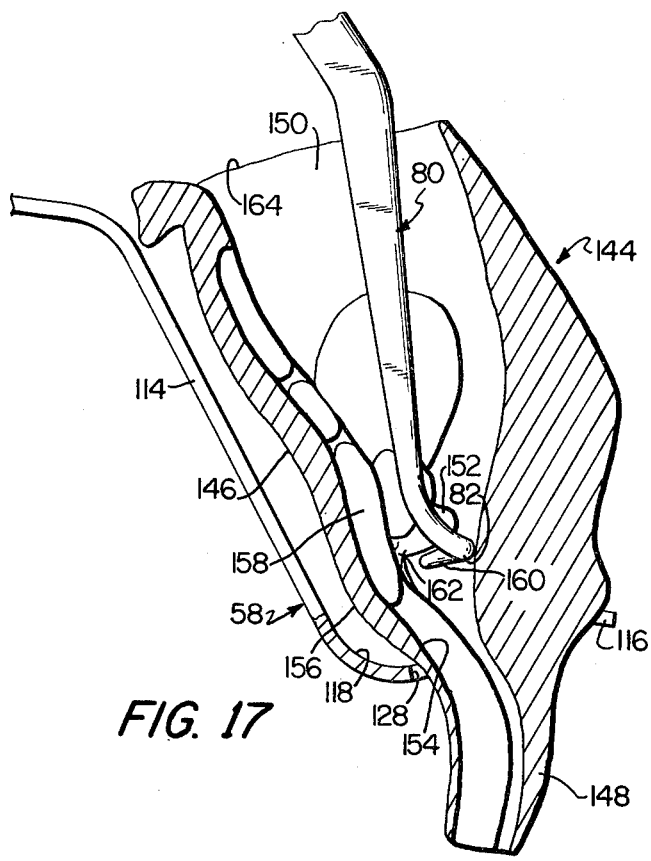
FIG. 17
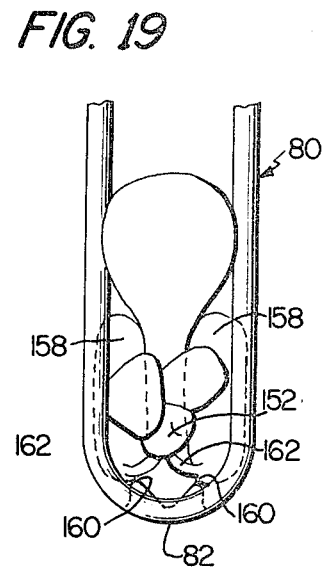
FIG. 19
FIG. 20
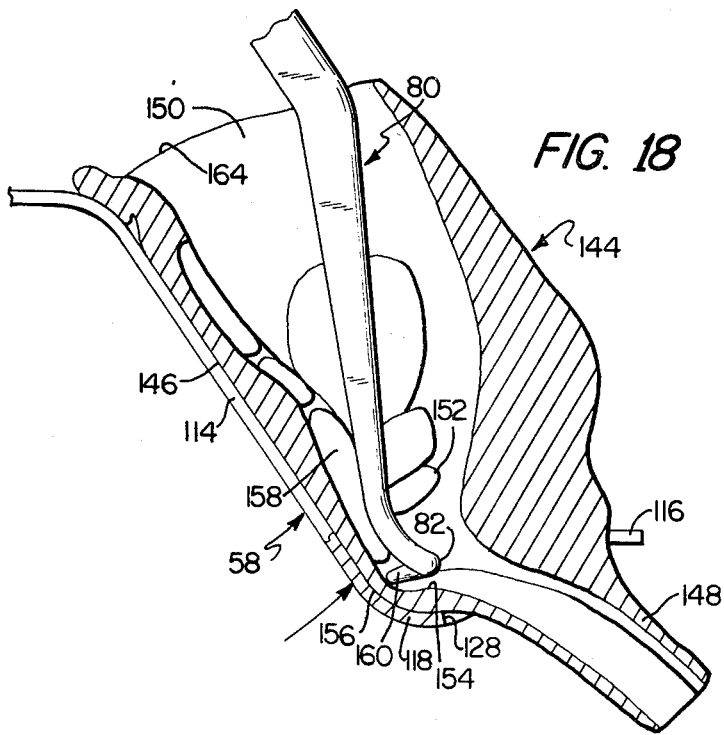
FIG. 18
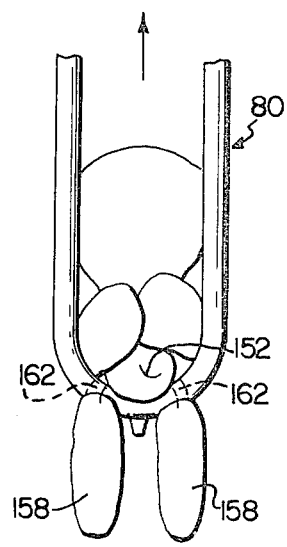
FIG. 21

METHOD AND APPARATUS FOR EVISCERATING POULTRY

TECHNICAL FIELD

This invention relates to the field of mechanized evisceration of poultry carcasses.

BACKGROUND ART

Prior eviscerating machines have not always been totally successful in removing all or substantially all of the lungs from a poultry carcass along with the rest of the viscera on a high percentage basis. By the same token, however, machines manufactured and sold by the assignee of the present invention have performed quite admirably and have significantly advanced the state of the art. See for example prior U.S. Pat. Nos. 3,555,593 to Scheier; 3,653,093 to Scheier; 3,798,708 to Scheier; and 4,019,222 to Scheier et al.

SUMMARY OF THE PRESENT INVENTION

The principle objective of the present invention is to provide eviscerating apparatus and method that will increase the yield with respect to lungs removed during evisceration. Pursuant to this objective, the present invention contemplates manipulating the shoulders and neck of the carcass in such a way when the removal tool is substantially fully inserted into the body cavity as to assure that the tip of the tool engages the cavity at its deepest point, along the interior intersection of the neck with the shoulders, thereby increasing the likelihood that prongs on the tip of the tool will snag veins and arteries leading between the heart and lungs as the tool is withdrawn, to the end that the lungs will be wholly peeled from their sockets as the heart and other organs are captured by the tool and pulled along with the veins and arteries from the cavity. Thus, at substantially the innermost limit of the entry stroke of the tool, the carcass is jammed upwardly against the tip of the tool while the neck is cocked rather dramatically toward the breast side of the carcass, either or both of which actions promotes the withdrawal of the lungs in the manner above described.

BRIEF DESCRIPTION OF THE DRAWINGS

FIG. 3 is an enlarged, fragmentary detail view of one of the processing units taken from the side thereof;

FIG. 4 is a front view thereof taken substantially along sight line 4—4 of FIG. 3;

FIG. 5 is an enlarged, fragmentary cross-sectional view of the lowermost leg of the carcass holder taken substantially along line 5—5 of FIG. 3;

FIG. 6 is a fragmentary cross-sectional view of such leg of the holder taken substantially along line 6—6 of FIG. 5;

FIG. 7 is an enlarged, fragmentary elevational view, partly in cross section, of a removal tool of one of the units;

FIG. 8 is a fragmentary, enlarged cross-sectional view thereof taken substantially along 8—8 of FIG. 7;

FIG. 9 is an enlarged, fragmentary cross-sectional view of the removal tool taken substantially along line 9—9 of FIG. 7;

FIG. 10 is an enlarged, fragmentary elevational view of the lowermost tip of such tool;

FIGS. 17 and 18 are enlarged diagrammatic illustrations of the action of the removal tool within the body cavity of the carcass at substantially the limit of full entering stroke of the tool; and FIGS. 19, 20 and 21 are likewise diagrammatic views showing the action of the removal tool from a different angle when the latter is at the limit of its entry stroke and has begun the withdrawal stroke.

DETAILED DESCRIPTION

Figure 1:
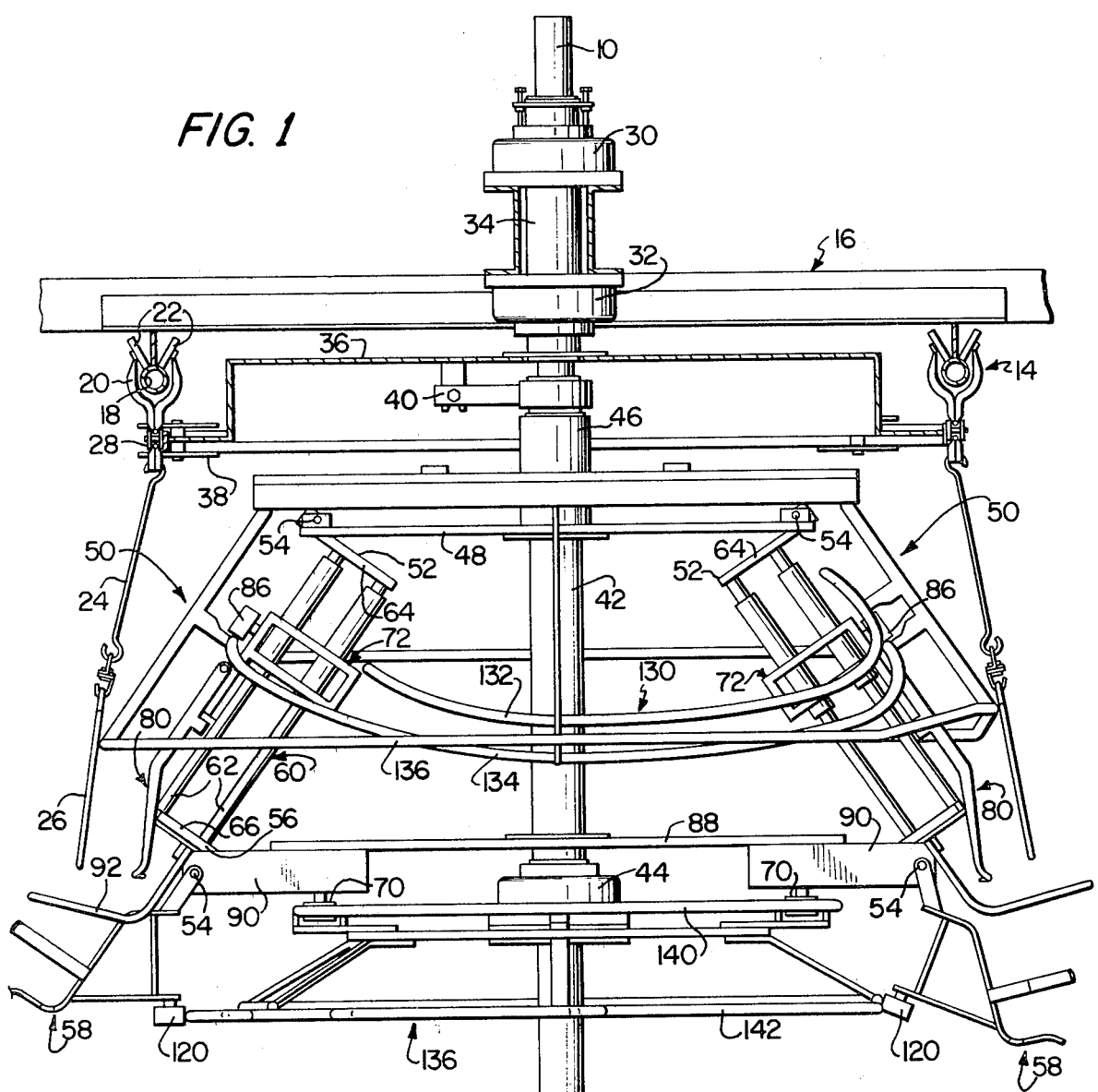
FIG. 1 is an elevational view, partly in cross section, of eviscerating apparatus constructed in accordance with the principles of the present invention and capable of carrying out the novel method, only two of the several processing units normally associated with the machine being illustrated.

The machine of the present invention is basically of the carousel type wherein carcasses suspended in succession from an overhead conveyor swing into units of the machine that grasp the carcasses, hold them immobile while the units continue to rotate and perform the processing functions, and then release them for continued conveyance to subsequent processing steps. With this in mind, then, the machine has a central post 10 running the full length of the machine, defining its axis of rotation, and supported by suitable structure such as a hydraulic piston and cylinder assembly 12. Actuation of piston and cylinder assembly 12 may be used to control the height of post 10.

An overhead conveyor 14 supported by superstructure 16 partially encircles the post 10 in radially spaced relationship to the latter and includes a tubular track 18 along which hangers 20 ride by way of rollers 22. Suitable drop rods 24 and shackles 26 depend from the hangers 20 for suspending the poultry carcasses, the hangers 20 of course being interconnected by a common conveying chain 28 that is only partially visible throughout the figures.

The superstructure 16 has a pair of upper bearings 30 and 32 on the axis of rotation of the machine which support a relatively short tube 34 for rotation about the upper end of the central post 10. The lower end of the tube 34 is rigidly affixed to an impulse wheel 36 having circumferentially spaced devices 38 of any suitable design around its periphery for engaging and retaining the hangers 20 as they move around the machine. Conveyor 14, therefore, serves to drive the impulse wheel 36, which in turn provides the driving power for rotating the processing units yet to be described.

The impulse wheel 36, through a suitable cranklike connector 40 or other device, transmits driving power to a relatively long tube 42 which coaxially houses the post 10 below the upper bearings 30 and 32. The upper end of the tube 42 terminates just below the upper surface of the wheel 36, while the lower end of the tube 42 terminates within a lower bearing 44 which rotatably supports the tube 42. A second lower bearing 46 adjacent the upper end of the tube 42 also helps guide the latter in its rotation with the wheel 36. An annular mounting platform 48 is secured to the tube 42 for rotation therewith a short distance below the wheel 35, and it is to the platform 48 that a number of identical processing units are attached, only two of such units being illustrated and both being designated by the numeral 50.

Each unit 50 slopes downwardly and outwardly from the platform 48 with its upper end 52 swingably mounted on the platform 48 by a pivot 54 and its lower end 56 terminating just above a holder 58 that serves to hold the carcass in place for the unit 50 during processing. As will become apparent, each unit 50 and corresponding holder 58 are mechanically separate mechanisms which cooperate with one another during processing but which do not swing together about the upper pivot 54.

Each unit 50 has a main frame 60 that includes a pair of long sloping guide shafts 62 held in parallel but spaced apart relationship by a short upper cross member 64 (receiving pivot 54) and a longer, lower cross member 66 at lower end 56. The inner end 68 of lower cross member 66 carries a rotatable cam follower 70. A subframe 72 is guided by shafts 62 for up-and-down movement along the latter, having a pair of vertically spaced upper cross pieces 74 that carry anti-friction sleeves 76 which receive the shafts 62. A frontpiece 78 of the subframe 72 supports a removal tool in the form of a generally U-shaped rigid loop 80 shown in front elevation in FIG. 4. The loop 80 has an arcuate bight 82 at its lower end that is outturned slightly from and interconnects the two legs 84 of the loop 80. A rotatable cam follower 86 is mounted on frontpiece 78.

In addition to the processing units 50, the main rotating tube 42 of the machine also carries the holders 58 for registration with their respective processing units 50. In this regard, a circular plate 88 is rigidly affixed to the tube 42 adjacent its lower end and just above the lower bearing 44. Plate 88 has circumferentially spaced pairs of mounting bars 90 that project radially from the periphery of the plate 88, the number of pairs of the bars 90 being determined by the number of holders 58 and units 50 on the machine. The space between each pair of the bars 90 provides clearance for and receives the lower end 56 of the corresponding unit 50 to allow the latter to move in a swinging motion inwardly and outwardly about its pivot 54 in response to forces acting upon the cam follower 70.

Fixed to the cross member 66 at the lower end 56 of each unit 50 is a carcass positioning member 92 of generally U-shaped configuration as shown particularly clearly in FIG. 4. The member 92 projects downwardly for a distance in substantial parallelism to the path of travel of the subframe 72 and then juts outwardly to terminate beyond the removal tool 80. The member 92 is adapted to fit between the legs of a carcass when the latter is suspended from a shackle 26.

Each removal tool 80 is attached to its corresponding subframe 72 via a pivot 94 which permits the tool 80 to swing toward and away from the front piece 78 of the subframe 72. Such swinging is quite limited in scope, however, and is primarily intended to provide a way of putting the bight or tip 82 of the tool 80 under spring tension in the manner as will now be described.

The front piece 78 of the subframe 72 has a block 96 (see FIGS. 4, 7, 8, and 9) attached to the front face thereof which is situated between the legs 84 of tool 80 such that legs 84 straddle the block 96 in the manner shown in FIG. 4. The block 96 also extends downwardly beyond the lower terminal edge 98 of the front piece 78 until itself terminating in a lowermost end 100. Slightly above lower end 100, the block 96 is provided with a rearwardly facing socket 102 which receives a compression spring 104 projecting outwardly and rearwardly beyond the socket 102 into engagement with the head of an adjusting screw 106 threaded into an arch 108 across the back of the tool 80 and interconnecting the legs 84 thereof. Thus, the spring 104 may be compressed by the adjusting screw 106 to such an extent that spring 104 applies biasing force to the arch 108 rearwardly away from the block 96, thereby yieldably biasing the tool 80 about the pivot 94 toward and against the front piece 78. The degree of compression of the spring 104 may be adjusted by manipulating the position of the screw 106 via the open rearmost end of the bore 110 within which the screw 106 is located.

Each of the holders 58 is of generally L-shaped configuration as viewed in FIG. 3 and is attached to a corresponding pair of the bars 90 via a horizontal pivot 112 which permits the holder 58 to swing inwardly and outwardly with respect to the central shaft 42 of the machine. Each holder 58 has a sloping, generally rectilinear first leg 114 comprising that portion of the holder 58 which is adapted to lie along the back side of a carcass. That portion of the holder 58 adapted to lie along and beneath the shoulders of a carcass comprises a second leg 116, the legs 114 and 116 being interconnected at their points of intersection by a concave portion 118 defining a seat for the shoulders of the carcass. Legs 114, 116 and portion 118 are all integrally interconnected such as to move bodily about the pivot 112 when camming force is applied to a cam follower 120 positioned rearwardly of the leg 114 by intersecting struts 122 and 124 likewise rigid to the leg 114. Each holder 58 also includes a pair of outwardly projecting wing bars 126 on opposite lateral sides of the leg 114 that are adapted to slide over the wings of the carcass when the latter is positioned on the holder 58 so as to hold the carcass against movement upwardly along the holder 58 during evisceration.

As illustrated particularly in FIGS. 5 and 6, the second leg 116 of the holder 58 is forked so as to present a notch 126 extending inwardly from the outermost extremity 116a of the leg 116. The notch 126 has a root 128 at its innermost extent that is spaced outwardly from the leg 114 by the concave portion 118. As shown in FIG. 5, the notch 126 is generally V-shaped such that the root 128 converges essentially to a slightly rounded point.

As illustrated in FIG. 1, the machine and apparatus of the present invention includes a somewhat conically shaped set of upper cam tracks 130 looped somewhat circularly about the central tube 42. The cam tracks 130 include a pair of generally vertically spaced rods 132 and 134 which receive the following roller 86 of subframe 72 so as to determine the position of the tool 80 in a generally up and down direction during the entering and withdrawal strokes thereof. Furthermore, the tracks 130 include a rod 136 disposed radially outwardly from the rods 132, 134 and located at a level to be engaged by the shackles 26 as the latter move about the machine, the radial distance of the rod 136 from the center of the machine being somewhat greater than the corresponding distance of the conveyor 14 from the center of the machine such that the rod 136 holds the shackles 26 slightly outwardly from a true vertical position in the manner illustrated in FIG. 1.

A second set of lower cam tracks 136 is disposed below the circular plate 88 for controlling the in and out positioning of the units 50 and the operation of the holders 58. To this end, the lower set of tracks 136 includes a pair of rods 138 and 140 looped about the center post 42 of the machine at radially spaced locations for receiving the following roller 70 of the unit 50 so as to control the in and out swinging movement thereof about the pivot 54. The lower set of tracks 136 further includes a lowermost and outermost rod 142 likewise looped about the center post 42 but at a position spaced substantially radially outwardly from the rods 138 and 140 and below the same in disposition for operating engagement with the following rollers 120 of the holders 58.

OPERATION

Figure 2:
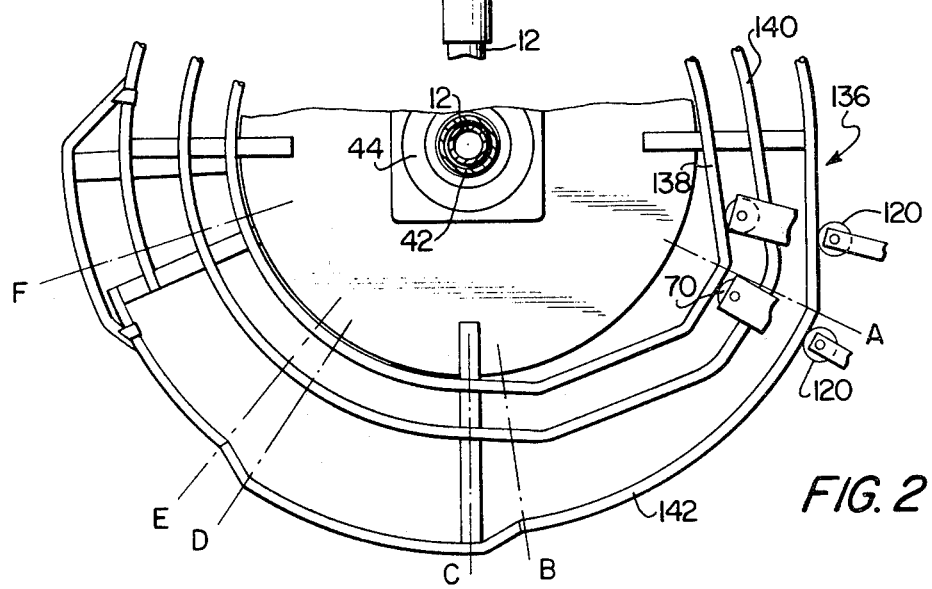
FIG. 2 is a fragmentary, substantially horizontal cross-sectional view through the machine and looking downwardly at a point just above the two lower cam tracks of the machine.
Figure 11:
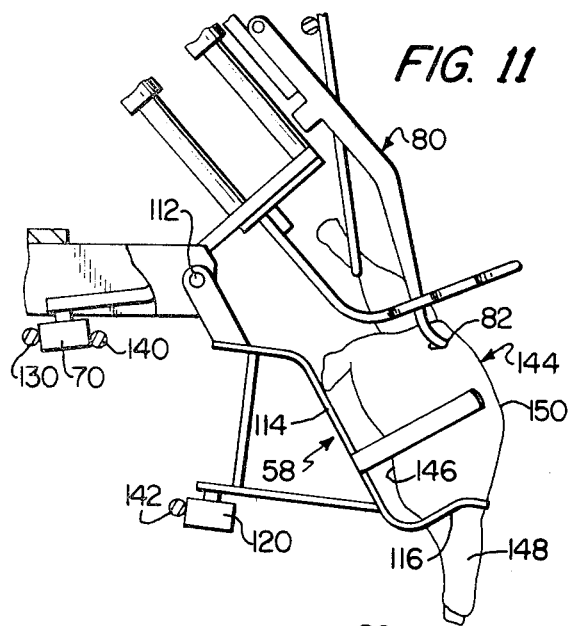
FIGS. 11–16 are schematic and diagrammatic illustrations of certain of the steps involved in the eviscerating method of the present invention.

The rotating components of the machine and the conveyor 14 move in a clockwise direction viewing FIG. 2. As the conveyed carcasses intersect corresponding ones of the units 50, the shackles 26 engage the outside of the guide rod 136 and ride along the latter for the continuation of the eviscerating procedure. The removal tool 80 of the unit 50 receiving a carcass is fully raised at the outset of the procedure in the manner illustrated in FIG. 1 and the carcass becomes loosely received by the corresponding holder 58 with the back side of the carcass facing the leg 114 of the holder 58. The opposite legs of the carcass straddle the positioning member 92 so as to properly orient a pre-prepared opening at the stern of the carcass with the removal tool 80, the neck of the carcass becomes received within the notch 126 of leg 116 of the holder 58, and the wing bars 126 become positioned in overlying relationship to the wings of the carcass.

FIGS. 11-16 are particularly useful in providing a clear understanding of the operation of the machine and will thus be referred to extensively hereinafter. By the time the carcass 144 reaches the condition of FIG. 11 in which the removal tool 80 has entered the body cavity of the carcass 144 via the opening at the stern thereof, the following roller 70 and the roller 120 will have reached position A in their respective tracks as illustrated in FIG. 2. Thus, the position of the rollers 70 and 120 at point A in FIG. 2 corresponds with the condition of things illustrated in FIG. 11. Note at this time that while the carcass 144 is received on the holder 58, the back 146 of the carcass 144 is spaced outwardly from the leg 114 of holder 58 and the neck 148 of the carcass 144 is hanging loosely downwardly in a substantially vertical orientation.

As the unit in question moves further on around the machine until the following roller 70 and 120 reach position B of FIG. 2, the tool 80 moves along the breast 150 of the carcass 144 interiorly thereof and in somewhat of an arcuate motion as the follower 70 moves somewhat closer to the central upright axis of the machine. Of course, during this time the roller 86 associated with the subframe 72 has been shifted downwardly by its own cam track so as to push the tool 80 more deeply into the body cavity at this time substantially to the full limit of the entry stroke of the tool 80. The position of the holder 58 in an in and out sense does not change from FIG. 11 to FIG. 12 because that stretch of the rod 142 for the roller 120 is concentric with the central upright axis of the machine at that stretch of operation.

Figure 12:
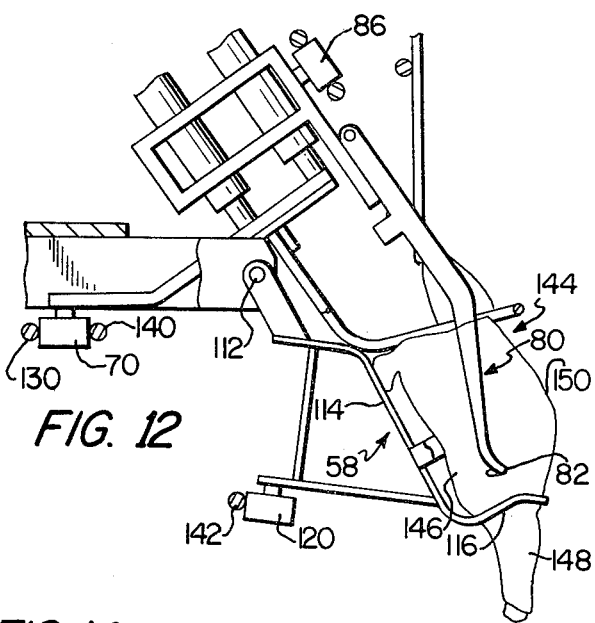

The condition of things illustrated in FIG. 12 corresponds to that in the enlarged view of things in FIG. 17 by which it may be seen that the tip 82 of the tool 80 is deeply within the body cavity 150 slightly below the heart 152 but perhaps a short distance above the intersection 154 between the neck 148 and the shoulders 156.

Figure 13:
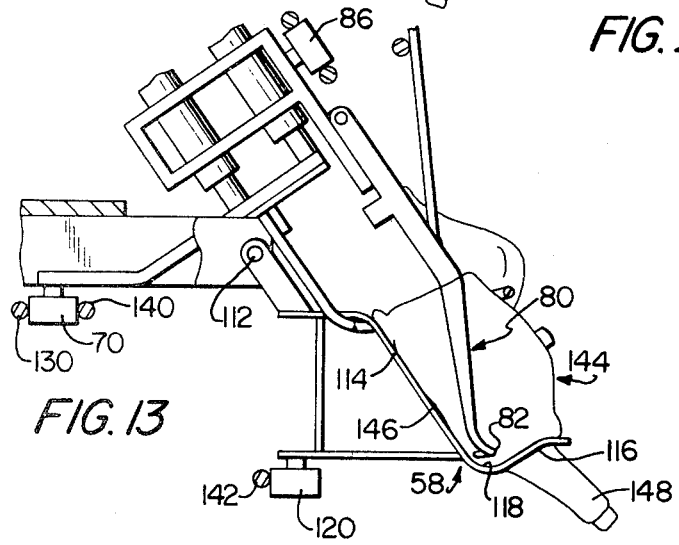

As the unit 50 then moves a short additional distance around the machine, the holder 58 is caused to swing upwardly and outwardly as shown in FIGS. 13 and 18 so that the shoulders 156 are seated firmly within the concave seat portion 118 of the holder 58 and the root 128 of the notch 126 firmly engages the back side of the neck 148. Continued movement or shifting of the holder 58 in this manner relative to the substantially stationary tool 80 at this time causes the intersection 154 of the neck 148 and the shoulders 156 to be jammed up against the tip 82 such that the latter becomes positioned well below the heart 152 and perhaps below also the lungs 158 lying in sockets along the back 146 on oppostie sides of the backbone thereof. Viewing FIG. 2 it may be seen that this action on the part of the holder 58 is caused by the following roller 120 moving abruptly radially outwardly from position B to position C on its cam rod 142.

This abrupt shifting of the holder 58 toward the tip 82 of the tool 80 and firm engagement of the root 128 of notch 126 with the neck 148 causes the latter to be cocked outwardly toward the breast side of the carcass 144 as is clearly seen by comparing FIGS. 12 and 13 or FIGS. 17 and 18. It is believed that such cocked condition of the neck 148 either taken alone or in combination with the fact that the intersection 154 is jammed up against the tip 82 contributes significantly to removal of the lungs 158 with the other organs during the withdrawal stroke of the tool 80 as will subsequently appear. In any event, FIGS. 19 and 20 correspond to the condition of things in FIGS. 13 and 18 and show that, at this point in the process, a pair of laterally spaced prongs 160 on the tip 82 of tool 80 are situated below veins or arteries 162 interconnecting the lungs 158 with the heart 152. The prongs 160 are also located on opposite sides of the backbone 164 of the carcass 144 as shown perhaps most clearly in FIG. 20.

The tool 80 then commences its withdrawal stroke, dragging the prongs 160 along opposite sides of the backbone 164 toward the stern 164 of the carcass 144. This movement is represented by the distance from point C to point D in FIG. 2, it being noted that the rod 142 for the roller 120 maintains a constant radial distance from the central axis of the machine as do also the rods 138, 140 for the roller 70. Thus, the tool 80 moves toward the position of FIG. 14 and in so moving, the prongs 160 snag the veins and arteries 162 in the manner illustrated in FIG. 21. Because the heart 152 and other organs are essentially captured within the loop of the tool 80 and are thus forced to move with the same during the withdrawal stroke, the lungs 158 are literally peeled up out of their sockets as the heart 152 exerts a pulling force via the veins and arteries 162.

Figure 14:
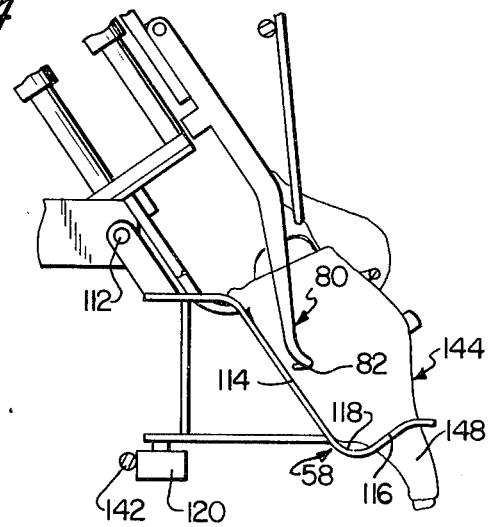
Figure 15:
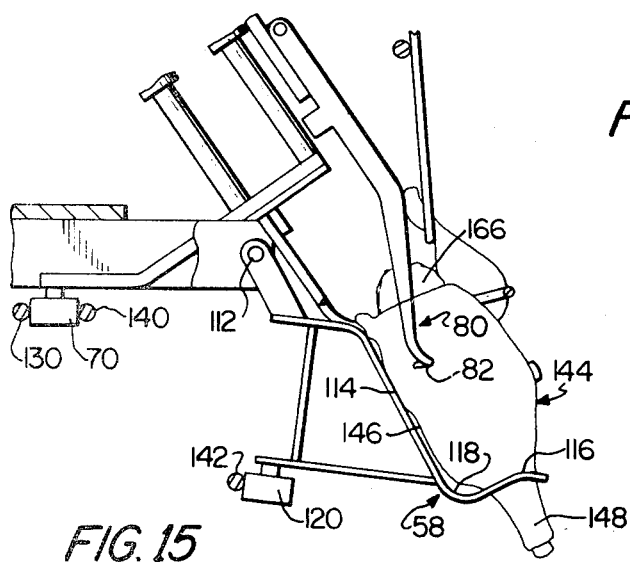
Figure 16:
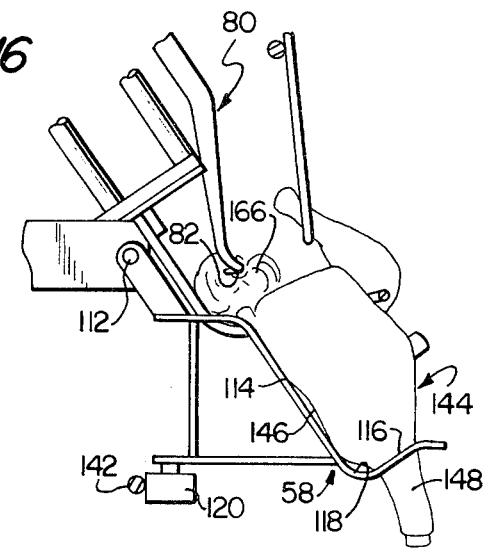

Substantially at the time the tip of the tool 80 arrives at the point along the backbone illustrated in FIG. 14, the roller 20 moves inwardly along its rod 142 to point E on the latter, thereby causing the holder 58 to swing downwardly and rearwardly away from the tip of the tool 80 as shown in FIG. 15, thereby enabling the tool 80 to pass lightly over the remainder of the back 146 of the carcass 144 throughout the rest of its movement toward the stern 164. Then, just as the tool 80 leaves the body cavity 150 with the mass of viscera denoted broadly by the numeral 166 in FIG. 16, the roller 142 encounters an outwardly bowed portion of the rod 142 at point F, causing the holder 58 to swing back upwardly and outwardly a short distance so as to likewise swing the carcass 144 in a direction to drape the viscera 166 over the stern 164. At that point the conveyor 14 may separate from the machine and carry the carcass 144 on to a further processing station if desired.

We claim:

1. Apparatus for eviscerating poultry carcasses including:
    means for cocking the neck of a carcass forwardly toward the breast side of the carcass relative to the remainder of the carcass;
    a removal tool; and
    means for operating said tool in a manner to insert the tool into the body cavity of the carcass through an opening at the stern thereof, capture viscera with the tool while the neck of the carcass is cocked, and withdraw the tool and captured viscera from the cavity.

2. In a machine for eviscerating poultry carcasses as claimed in claim 1, wherein said means for cocking the neck of a carcass includes structure engageable with the neck adjacent the shoulders of the carcass, and means for relatively shifting the carcass and said structure in a direction to cause said structure to cock the neck.

3. In a machine for eviscerating poultry carcasses as claimed in claim 2, wherein said means for relatively shifting the carcass and said structure is operable to shift the structure.

4. In a machine for eviscerating poultry carcasses as claimed in claim 1, wherein said means for cocking the neck of the carcass includes a generally L-shaped holder for the carcass having one leg thereof adapted to lie along the back side of the carcass and a second leg having a notch extending inwardly from the outer extremity thereof for receiving the neck of the carcass, said notch having a root at the innermost extremity thereof that is spaced outwardly from said one leg for engaging the neck and cocking the same outwardly when the back of the carcass is engaged against said one leg.

5. In a machine for eviscerating poultry carcasses as claimed in claim 4, wherein said holder is provided with a concave, shoulder-receiving seat at the intersection of said legs.

6. In a machine for eviscerating poultry carcasses as claimed in claim 4, wherein said apparatus further includes means for suspending the carcass by its legs during operation of said tool, said means for cocking the neck of the carcass further including means for shifting said holder in a direction to force the back of the carcass against said one leg of the holder, the shoulders of the carcass against said other leg, and the neck of the carcass against said root of the notch.

7. In a machine for eviscerating poultry carcasses as claimed in claim 6, wherein said apparatus further includes means for conveying the carcass along a path of travel while said tool is being operated.

8. Apparatus for eviscerating poultry carcasses including:
    a carcass holder including a portion adapted to engage and support the shoulders of the carcass;
    a removal tool having a tip;
    means for operating said tool through an entry stroke during which the tool is introduced tip-first into the body cavity of the carcass via an opening at the stern of the carcass to capture viscera within the tool and through a subsequent withdrawal stroke during which the tool is pulled tip-last with the captured viscera from the body cavity via said opening; and
    means for shifting at least said portion of the holder in a direction generally toward said tip of the tool when the latter is substantially at the limit of its entry stroke to assist in locating said tip of the tool deeply within the body cavity for the withdrawal stroke.

9. In a machine for eviscerating poultry carcasses as claimed in claim 8, wherein said tool has a pair of prongs at said tip spaced apart transversely with respect to the normal path of travel of the tool and disposed to move along opposite sides of the backbone of the carcass during said withdrawal stroke.

10. In a machine for eviscerating poultry carcasses as claimed in claim 8, wherein said holder further includes a portion adapted to lie along the back side of the carcass; and means for shifting said holder slightly laterally away from the tool at a point during said withdrawal stroke of the tool.

11. Apparatus for eviscerating poultry carcasses as claimed in claim 8, wherein said holder is generally L-shaped, having one leg adapted to lie along the back side of the carcass and a second leg adapted to lie along and beneath the shoulders of the carcass, said second leg comprising said portion of the holder.

12. Apparatus for eviscerating poultry carcasses as claimed in claim 11, wherein said second leg is provided with a neck-receiving notch leading inwardly from an outermost extremity of the second leg and terminating in an innermost root spaced outwardly from said one leg.

13. Apparatus for eviscerating poultry carcasses as claimed in claim 12, wherein said holder is provided with a concave, shoulder-receiving seat at the intersection of said legs.

14. A carcass holder for use in eviscerating poultry carcasses, said holder including:
    a first leg adapted to lie along the back side of a carcass;
    a second leg projecting outwardly from the plane of said first leg and adapted to lie along and beneath the shoulders of the carcass,
    said second leg having a neck-receiving notch therein leading inwardly from an outermost extremity of the second leg and terminating inwardly in a root; and
    means interconnecting said legs adjacent proximal ends thereof and spacing said root of the notch outwardly from said first leg a sufficient distance to cause the neck of the carcass to be cocked outwardly toward the breast side of the carcass when the back of the carcass is engaged against said first leg and said shoulders of the carcass are engaged against said second leg.

15. A carcass holder as claimed in claim 14, wherein said legs and said interconnecting means are integrally joined with one another.

16. A carcass holder as claimed in claim 14, wherein said interconnecting means is formed to present a concave, shoulder-receiving seat.

17. A method of eviscerating poultry carcasses including the steps of:
    inserting a viscera-removing tool tip-first into the body cavity of a carcass in an entry stroke via an opening in the stern of the carcass to capture viscera with the tool;

substantially when the tool has reached the full limit of its entry stroke, shifting the shoulders of the carcass toward said tip of the tool to promote, complete viscera removal; and subsequently pulling the tool tip-last and captured viscera from the body cavity in a withdrawal stroke.

18. A method of eviscerating poultry carcasses as claimed in claim 17, wherein is included the additional step of cocking the neck of the carcass toward the breast side of the carcass at the time the shoulders of the latter are shifted toward the tip of the tool.

19. A method of eviscerating poultry carcasses as claimed in claim 18, wherein said entry and withdrawal steps are carried out in a looping motion with the entry stroke being generally arcuately along the breast of the carcass and the withdrawal stroke being generally rectilinearly along the backbone of the carcass.

20. A method of eviscerating poultry carcasses as claimed in claim 17, wherein is provided the additional step of shifting the back of the carcass laterally away from the tip of the tool at a point during the withdrawal stroke.

21. A method of eviscerating poultry carcasses as claimed in claim 17, wherein said steps of inserting, shifting and pulling are carried out while the carcass is being conveyed along a predetermined path of travel.

22. A method of eviscerating poultry carcasses including the steps of:

inserting a viscera-removing tool into the body cavity of the carcass in an entry stroke via an opening at the stern of the carcass;

cocking the neck of the carcass toward the breast side of the carcass substantially by the time the tool has reached the full extent of its entry stroke; and pulling the tool and viscera captured thereby from the cavity in a withdrawal stroke via said opening.

23. A method of eviscerating poultry carcasses as claimed in claim 22, wherein is included the additional step of shifting the shoulders of the carcass toward the tip of the tool substantially simultaneously with said cocking of the neck.

24. A method of eviscerating poultry carcasses as claimed in claim 23, wherein said entry and withdrawal steps are carried out in a looping motion with the entry stroke being generally arcuately along the breast of the carcass and the withdrawal stroke being generally rectilinearly along the backbone of the carcass.

25. A method of eviscerating poultry carcasses as claimed in claim 22, wherein is provided the additional step of shifting the back of the carcass laterally away from the top of the tool at a point during the withdrawal stroke.

26. A method of eviscerating poultry carcasses as claimed in claim 22, wherein said steps of inserting, cocking and pulling are carried out while the carcass is being conveyed along a predetermined path of travel.

* * * * *